(12) United States Patent
Newton

(10) Patent No.: US 6,209,578 B1
(45) Date of Patent: Apr. 3, 2001

(54) CONSTANT FLOW VALVE

(75) Inventor: John R. Newton, Lighthouse Point, FL (US)

(73) Assignee: Global Agricultural Technology and Engineering, LLC, Deerfield Beach, FL (US)

(*) Notice: Subject to any disclaimer, the term of this patent is extended or adjusted under 35 U.S.C. 154(b) by 0 days.

(21) Appl. No.: 09/449,104

(22) Filed: Nov. 24, 1999

Related U.S. Application Data

(60) Provisional application No. 60/113,626, filed on Dec. 23, 1998.

(51) Int. Cl.[7] .................................................. G05D 16/08
(52) U.S. Cl. .............. 137/505.41; 137/505; 137/505.13
(58) Field of Search ............................. 137/505, 505.13, 137/505.18, 505.41

(56) References Cited

U.S. PATENT DOCUMENTS

| | | |
|---|---|---|
| 2,174,515 | 10/1939 | Hughes . |
| 2,639,194 | 5/1953 | Wahlin . |
| 3,229,714 * | 1/1966 | Raem ................. 137/505.41 |
| 3,424,196 | 1/1969 | Donner . |
| 3,643,685 | 2/1972 | Hays . |
| 3,872,884 | 3/1975 | Busdiecker et al. . |
| 3,943,969 | 3/1976 | Rubin et al. . |
| 3,948,285 * | 4/1976 | Flynn ................. 137/505.13 X |
| 4,074,694 | 2/1978 | Lee . |
| 4,080,993 | 3/1978 | Lind, Jr. . |
| 4,197,995 | 4/1980 | Campbell et al. . |
| 4,250,915 | 2/1981 | Rikuta . |
| 4,416,301 | 11/1983 | Brumm . |
| 4,437,493 | 3/1984 | Okuda et al. . |
| 4,508,140 | 4/1985 | Harrison . |
| 4,513,777 | 4/1985 | Wright . |
| 4,516,600 | 5/1985 | Sturman et al. . |
| 4,621,658 | 11/1986 | Buezis et al. . |
| 4,630,642 | 12/1986 | Detweiler . |
| 4,657,224 | 4/1987 | Lattuada . |
| 4,697,613 | 10/1987 | Wienck . |
| 4,838,305 | 6/1989 | Reinartz et al. . |
| 4,852,606 | 8/1989 | Heneker . |
| 4,867,198 | 9/1989 | Faust . |
| 5,234,025 | 8/1993 | Skoglund et al. . |
| 5,241,986 | 9/1993 | Yie . |
| 5,255,711 | 10/1993 | Reeds . |
| 5,303,734 | 4/1994 | Eidsmore . |
| 5,341,968 | 8/1994 | Vandoninck . |
| 5,383,489 | 1/1995 | Golestan et al. . |
| 5,524,670 | 6/1996 | Castle . |
| 5,529,090 | 6/1996 | Golestan et al. . |
| 5,597,012 | 1/1997 | Moinard . |
| 5,642,752 | 7/1997 | Yokota et al. . |
| 5,727,529 | 3/1998 | Tuckey . |
| 6,026,850 * | 2/2000 | Newton et al. ............ 137/505.41 |

FOREIGN PATENT DOCUMENTS

| | | |
|---|---|---|
| 530611 | 9/1956 | (CA) . |
| 1163585 | 9/1969 | (GB) . |
| 2006930 | 5/1979 | (GB) . |

* cited by examiner

Primary Examiner—Stephen M. Hepperle
(74) Attorney, Agent, or Firm—Samuels, Gauthier & Stevens

(57) ABSTRACT

A regulating valve is disclosed for controlling the flow of fluid from a variable pressure fluid supply. The valve includes a diaphragm which is resiliently biased into a normally closed position, and which shifts to an open position when exposed to a fluid pressure above a predetermined minimum level.

10 Claims, 2 Drawing Sheets

United States Patent 6,209,578 B1

CONSTANT FLOW VALVE

This application claims benefit of provisional application 60/113,626 Dec. 23, 1998.

BACKGROUND OF THE INVENTION

1. Field of the Invention

This invention relates to regulating valves used to control the flow of fluid between a variable pressure source and an applicator from which the fluid is discharged as a spray.

2. Description of the Prior Art

Portable sprayers are widely employed in the application of herbicides and other chemical containing fluids. The sprayers may be of the "compression" type, where fluid is delivered from a pressurized tank, or they may be of the so-called "knapsack" type, where fluid is delivered from unpressurized tanks by manually operable pumps. In both cases, delivery pressure will vary. Excessive pressure will overly atomize the fluid discharge, causing the fluid to drift from the intended target. On the other hand, inadequate pressure will have the opposite effect, resulting in a wasteful excessive fluid application.

SUMMARY OF THE INVENTION

The regulating valve of the present invention addresses these problems by automatically closing when fluid delivery pressure are below a predetermined minimum level required to effect efficient spraying, by automatically opening when fluid delivery pressures exceed that minimum level, and when open, by automatically maintaining a substantially constant fluid flow to the sprayer nozzle.

A more detailed description of the invention will now be provided with reference to the accompanying drawings, wherein:

DETAILED DESCRIPTION OF PREFERRED EMBODIMENT

Figure 1:
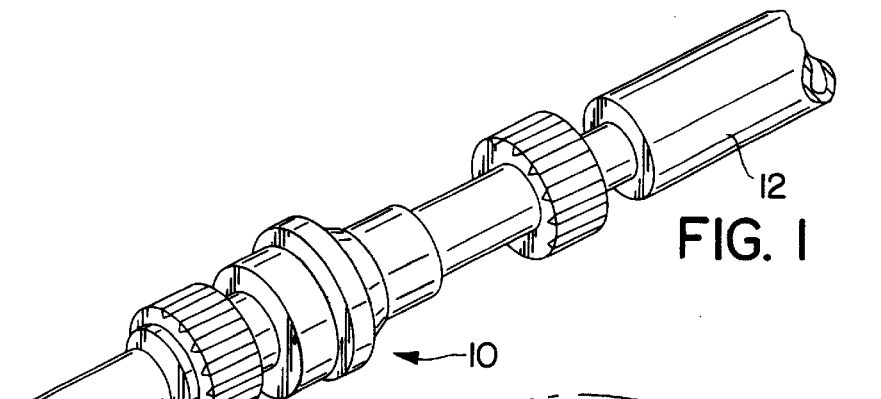
FIG. 1 is a perspective view of a regulating valve in accordance with the present invention shown interposed between a variable pressure fluid supply and a fluid outlet.
Figure 2A:
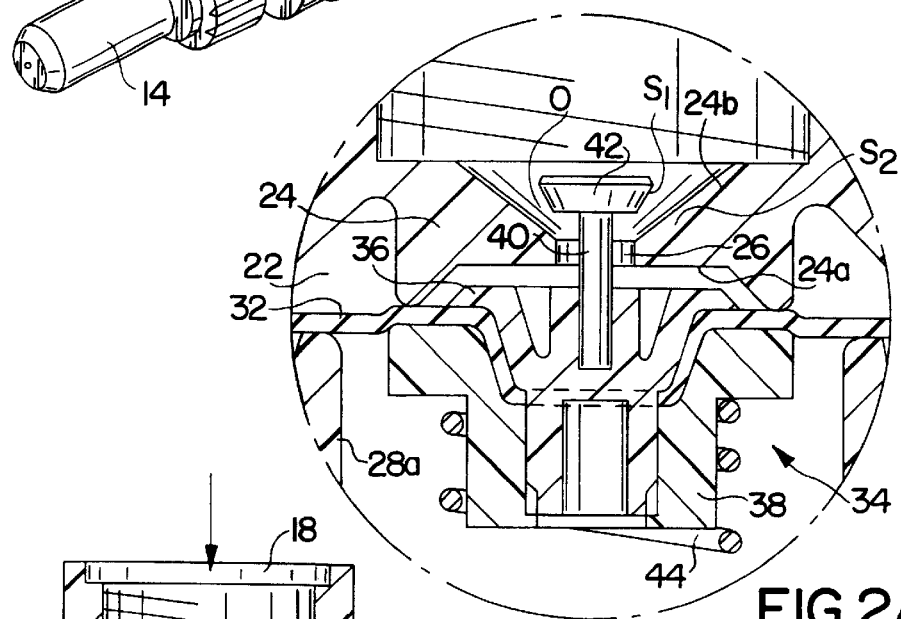
FIG. 2A is an enlarged view of a portion of the valve shown in FIG. 2.
Figure 2:
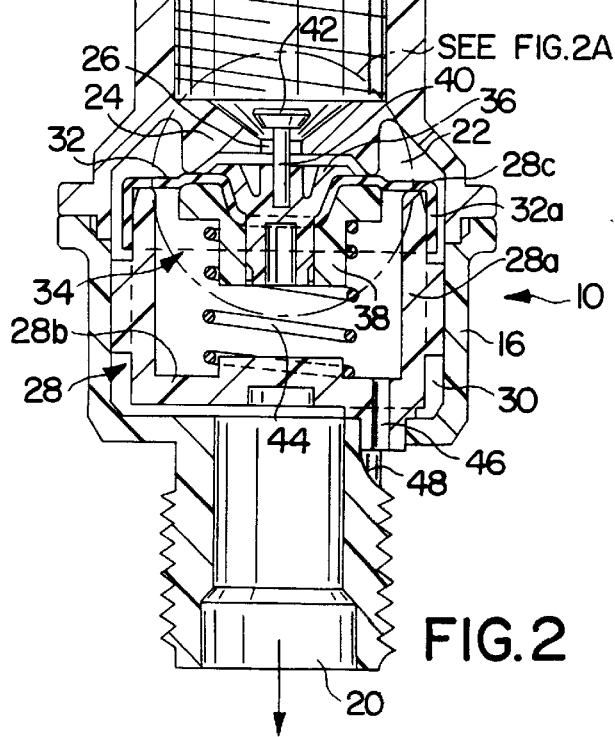
FIG. 2 is a longitudinal sectional view through the regulating valve.
Figure 3:
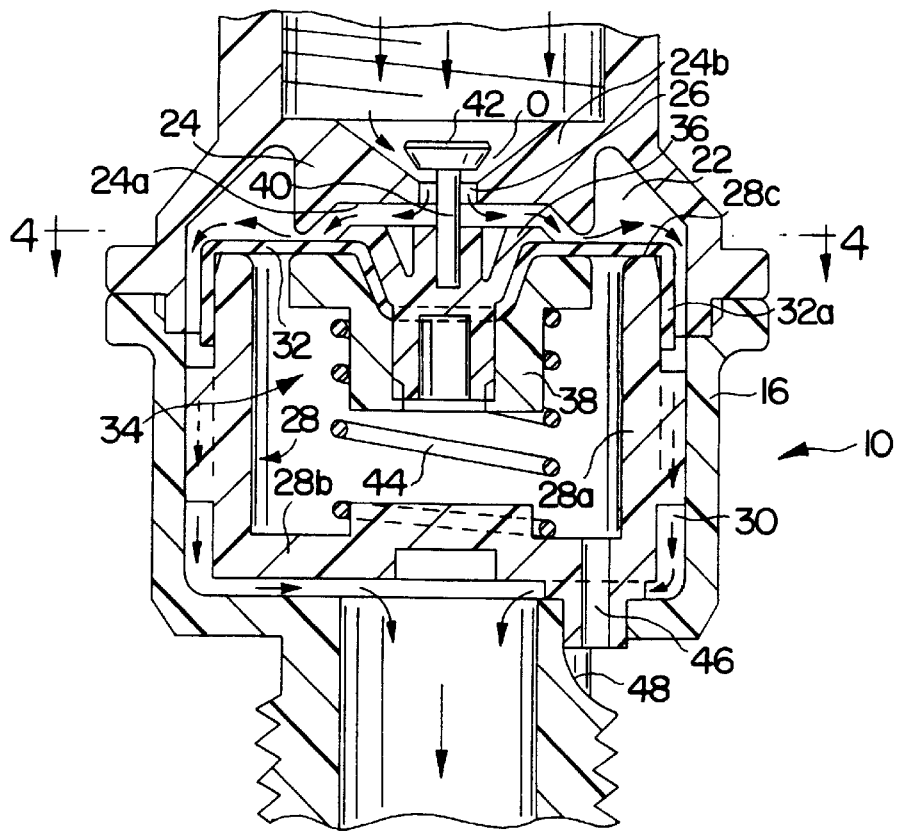
FIG. 3 is another enlarged longitudinal sectional view of the valve.
Figure 4:
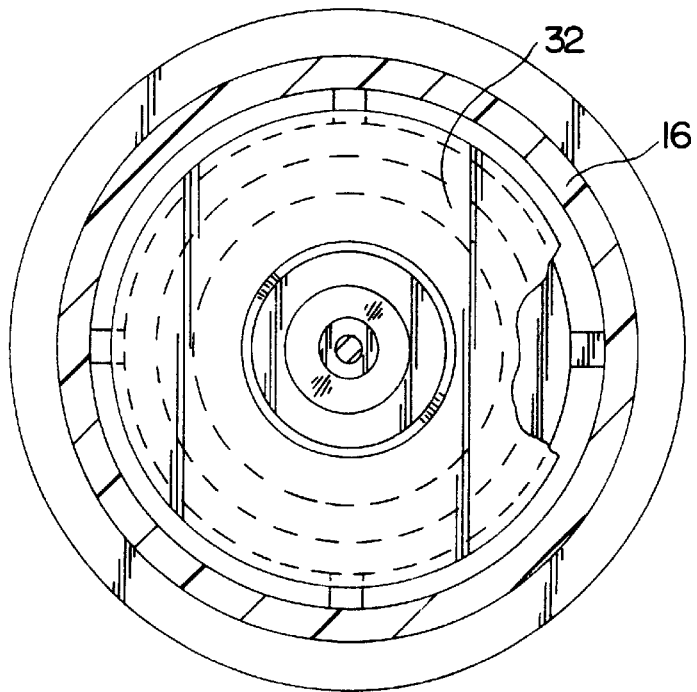
FIG. 4 is a cross sectional view taken along line 4—4 of FIG. 3.

Referring initially to FIG. 1, a regulating valve in accordance with the present invention is generally depicted at 10 between a variable pressure fluid supply 12 and a fluid outlet 14. The supply 12 may typically be the discharge hose or wand of a compression or knapsack sprayer (not shown), and the outlet 14 may be a sprayer nozzle or the like. The valve 10 includes a housing 16 having axially aligned inlet and outlet ports 18, 20 adapted to be connected respectively to the fluid supply 12 and the fluid outlet 14. The housing also includes a diaphragm chamber 22 interposed between the inlet and outlet ports 18, 20. The inlet port 18 is separated from the diaphragm chamber 22 by a barrier wall 24. The barrier wall 24 has a first passageway 26 extending therethrough from an inner side 24a facing the diaphragm chamber 22 to an outer side 24b facing the inlet port 18.

Contained within the diaphragm chamber 22 is a cup 28. The cup 28 has a cylindrical side wall 28a extending from a bottom wall 28b facing the outlet port 20 to a circular rim 28c surrounding an open mouth facing the inner side 24a of the barrier wall 24. The cylindrical side 28a and bottom walls 28b of the cup 28 are spaced inwardly from adjacent interior surfaces of the housing 16 to define a second passageway 30. The second passageway connects the diaphragm chamber 22 to the outlet port 20.

A resilient disc-shaped diaphragm 32 closes the open mouth of the cup 28. The diaphragm 32 is axially supported exclusively by the circular rim 28c and has a peripheral flange 32a overlapping the cylindrical side wall 28a. A piston assembly 34 is secured to the center of the diaphragm 32. The piston assembly has a cap 36 on one side of the diaphragm 32 which faces the inner side 24a of the barrier wall 24. A base 38 is suspended from the opposite side of the diaphragm 32 and projects into the interior of the cup 28.

A stem 40 projects from the cap 36 through the first passageway 26 in the barrier wall 24 to terminate in a valve head 42. The valve head 42 and the outer side 24b of the barrier wall 24 are configured to define a control orifice "O" which connects the inlet port 18 to the diaphragm chamber 22 via the first passageway 26.

A spring 44 in the cup 28 coacts with the base 38 of the piston assembly 34 to resiliently urge the diaphragm 32 into a normally closed position against the inner side 24a of the barrier wall 24 to thereby prevent fluid flow from the inlet port 18 via the first passageway 26 into the diaphragm chamber 22. Spring 44 responds to fluid pressure above a predetermined minimum level applied to the diaphragm 32 via the inlet port 18 and the first passageway 26 by resiliently accommodating movement of the diaphragm 32 away from the inner side 24a of the barrier wall 24. The valve head 42 on the stem 40 moves correspondingly to adjust the size of the control orifice O to thereby maintain a substantially constant flow of fluid from the inlet port 18, through the first and second passageways 26, 30, and then to the outlet port 20 for delivery to the fluid outlet 14.

The control orifice O includes frusto conical surfaces $S_1$ $S_2$ on the valve head 42 and the outer side 24b of the barrier wall 24. The cross sectional area of the control orifice O is less than the cross sectional area of the first passageway 26 throughout the range of movement of the valve head 42 in response to fluid pressure applied to the diaphragm 32.

A vent passageway 46 leads from the interior of the cup 28 to the exterior of the housing. The exterior of the housing is provided with a deflecting surface 48 adjacent to the outlet of the vent passageway 46. The deflecting surface 48 is configured and arranged to direct fluid escaping from the interior of the cup 28 in the general direction of fluid flowing through the valve 10, but angularly away from the valve axis.

The base of the piston assembly 34 is spaced from the bottom wall 28b of the cup 28 by an open gap. The spring 44 bridges that gap and is in contact at its opposite ends respectively with the bottom wall 28b and the base 38. The piston assembly 34 is centered within the cup 28 solely by the resilient support provided by the diaphragm 32.

The housing is comprised of mating plastic inlet and outlet sections formed by injection molding and permanently assembled one to the other by sonic welding.

The cap 36 and base 38 of the piston assembly 34 are each injection molded of plastic. They are joined one to the other by sonic welding, with a central portion of the diaphragm held therebetween.

In light of the foregoing, it will now be appreciated by those skilled in the art that the present invention embodies a number of significant advantages, the foremost being the automatic pressure responsive control of fluid flow between a variable pressure source and an applicator from which the fluid is to be applied in a substantially uniform manner. The regulating valve is designed for low cost mass production, having a minimum number of component parts, the majority of which can be precision molded and automatically assembled.

I claim:

1. A regulating valve for maintaining a substantially constant flow of fluid from a variable pressure fluid supply to a fluid outlet, said valve comprising:

a housing having axially aligned inlet and outlet ports adapted to be connected respectively to said fluid supply and said fluid outlet, and a diaphragm chamber interposed between said inlet and outlet ports, said inlet port being separated from said diaphragm chamber by a barrier wall, said barrier wall having a first passageway extending therethrough from an inner side facing said diaphragm chamber to an outer side facing said inlet port;

a cup contained within said diaphragm chamber, said cup having a cylindrical side wall extending from a bottom wall facing said outlet port to a circular rim surrounding an open mouth facing the inner side of said barrier wall, the cylindrical side and bottom walls of said cup being spaced inwardly from adjacent interior surfaces of said housing to define a second passageway connecting said diaphragm chamber to said outlet port;

a resilient disc-shaped diaphragm closing the open mouth of said cup, said diaphragm being axially supported exclusively by said circular rim and having a peripheral flange overlapping said cylindrical side wall;

a piston assembly secured to the center of said diaphragm, said piston assembly having a cap on one side of said diaphragm facing the inner side of said barrier wall, and a base suspended from the opposite side of said diaphragm and projecting into the interior of said cup;

a stem projecting from said cap through the first passageway in said barrier wall to terminate in a valve head, said valve head and the outer side of said barrier wall being configured to define a control orifice connecting said inlet port to said diaphragm chamber via said first passageway; and spring means in said cup coacting with the base of said piston assembly for resiliently urging said diaphragm into a closed position against the inner side of said barrier wall to thereby prevent fluid flow from said inlet port via said first passageway into said diaphragm chamber;

said spring means being responsive to fluid pressure above a predetermined level applied to said diaphragm via said inlet port and said first passageway by resiliently accommodating movement of said diaphragm away from the inner side of said barrier wall, with the valve head on said stem being correspondingly moved to adjust the size of said control orifice, thereby maintaining a substantially constant flow of fluid from said inlet port through said first and second passageways to said outlet port for delivery to said fluid outlet.

2. A regulating valve for controlling the flow of fluid from a variable pressure fluid supply to a fluid outlet, said valve comprising:

a housing having axially aligned inlet and outlet ports adapted to be connected respectively to said fluid supply and said fluid outlet, and a diaphragm chamber interposed between said inlet and outlet ports, said inlet port being separated from said diaphragm chamber by a barrier wall, said barrier wall having a first passageway extending therethrough from an inner side facing said diaphragm chamber to an outer side facing said inlet port;

a cup contained within said diaphragm chamber, said cup having a cylindrical side wall extending from a bottom wall facing said outlet port to a circular rim surrounding an open mouth facing the inner side of said barrier wall, the cylindrical side and bottom walls of said cup being spaced inwardly from adjacent interior surfaces of said housing to define a second passageway connecting said diaphragm chamber to said outlet port;

a resilient disc-shaped diaphragm closing the open mouth of said cup, said diaphragm being supported exclusively by said circular rim and having a peripheral flange overlapping said cylindrical side wall;

a piston assembly secured to the center of said diaphragm, said piston assembly having a base projecting into the interior of said cup; and spring means in said cup coacting with the base of said piston assembly for resiliently urging said diaphragm into a closed position against the inner side of said barrier wall to thereby prevent fluid flow from said inlet port via said first passageway into said diaphragm chamber;

said spring means being responsive to fluid pressure above a predetermined level applied to said diaphragm via said inlet port and said first passageway by resiliently accommodating movement of said diaphragm away from the inner side of said barrier wall, thereby accommodating a flow of fluid from said inlet port through said first and second passageways to said outlet port for delivery to said fluid outlet.

3. The regulating valve as claimed in claim 1 wherein said control orifice is defined by frusto conical surfaces on said valve head and the outer side of said barrier wall.

4. The regulating valve as claimed in claims 1 or 2 wherein the cross sectional area of said control orifice is less than the cross sectional area of said first passageway throughout the range of movement of said valve head in response to fluid pressure applied to said diaphragm.

5. The regulating valve as claimed in claims 1 or 2 further comprising a vent passageway leading from the interior of said cup to the exterior of said housing.

6. The regulating valve as claimed in claim 5 wherein said housing is exteriorly provided with a deflecting surface adjacent to the outlet of said vent passageway, said deflecting surface being configured and arranged to direct fluid escaping from the interior of said cup in the general direction of fluid flowing through said valve, but angularly away from the valve axis.

7. The regulating valve as claimed in claims 1 or 2 wherein the base of said piston assembly is spaced from the bottom wall of said cup by an open gap, and wherein said spring means comprises a coiled spring bridging said gap and in contact at its opposite ends with said bottom wall and said base.

8. The regulating valve as claimed in claim 7 wherein said piston assembly is centered within said cup solely by the resilient support provided by said diaphragm.

9. The regulating valve as claimed in claims 1 or 2 wherein said housing is comprised of mating plastic inlet and outlet sections, said sections being formed by injection molding and being permanently assembled one to the other by sonic welding.

10. The regulating valve as claimed in claims 1 or 2 wherein the cap and base of said piston assembly are each injection molded of plastic and joined one to the other by sonic welding, with a central portion of said diaphragm held therebetween.

\* \* \* \* \*